United States Patent
Matsuo

(10) Patent No.: US 12,381,225 B2
(45) Date of Patent: Aug. 5, 2025

(54) BINDER COMPOSITION FOR ALL-SOLID-STATE SECONDARY BATTERY, SLURRY COMPOSITION FOR ALL-SOLID-STATE SECONDARY BATTERY, SOLID ELECTROLYTE-CONTAINING LAYER, AND ALL-SOLID-STATE SECONDARY BATTERY

(71) Applicant: ZEON CORPORATION, Tokyo (JP)

(72) Inventor: Yusaku Matsuo, Tokyo (JP)

(73) Assignee: ZEON CORPORATION, Tokyo (JP)

(*) Notice: Subject to any disclaimer, the term of this patent is extended or adjusted under 35 U.S.C. 154(b) by 601 days.

(21) Appl. No.: 17/755,009

(22) PCT Filed: Oct. 14, 2020

(86) PCT No.: PCT/JP2020/038805
§ 371 (c)(1),
(2) Date: Apr. 19, 2022

(87) PCT Pub. No.: WO2021/085141
PCT Pub. Date: May 6, 2021

(65) Prior Publication Data
US 2022/0393175 A1    Dec. 8, 2022

(30) Foreign Application Priority Data

Oct. 31, 2019   (JP) .................................. 2019-199313

(51) Int. Cl.
*H01M 10/0525* (2010.01)
*H01M 4/62* (2006.01)
*H01M 10/0562* (2010.01)

(52) U.S. Cl.
CPC ....... *H01M 4/622* (2013.01); *H01M 10/0525* (2013.01); *H01M 10/0562* (2013.01); *H01M 2300/0071* (2013.01)

(58) Field of Classification Search
CPC ............ H01M 4/622; H01M 10/0525; H01M 10/0562; H01M 2300/0071
See application file for complete search history.

(56) References Cited

U.S. PATENT DOCUMENTS

| 2004/0076886 A1* | 4/2004 | Mori ...................... H01G 9/028 429/317 |
| 2014/0127579 A1 | 5/2014 | Yoshida et al. |
| 2019/0148733 A1 | 5/2019 | Oura |
| 2019/0229339 A1 | 7/2019 | Maeda et al. |
| 2021/0167389 A1* | 6/2021 | Maeda .............. H01M 10/0562 |

FOREIGN PATENT DOCUMENTS

| JP | 2010205449 A | 9/2010 |
| JP | 2013008611 A | 1/2013 |
| JP | 2016181471 A | 10/2016 |
| JP | 2019091632 A | 6/2019 |
| KR | 1020190062999 A | 6/2019 |
| WO | 2012173089 A1 | 12/2012 |
| WO | 2016136090 A1 | 9/2016 |
| WO | 2017033600 A1 | 3/2017 |
| WO | 2018047821 A1 | 3/2018 |
| WO | 2019107877 A1 | 6/2019 |
| WO | 2019116964 A1 | 6/2019 |
| WO | 2019131771 A1 | 7/2019 |

OTHER PUBLICATIONS

Dec. 22, 2020, International Search Report issued in the International Patent Application No. PCT/JP2020/038805.
May 3, 2022, International Preliminary Report on Patentability issued in the International Patent Application No. PCT/JP2020/038805.
Jul. 22, 2024, the Extended European Search Report issued by the European Patent Office in the corresponding European Patent Application No. 20882152.0.
Mar. 28, 2025, Communication pursuant to Article 94(3) EPC issued by the European Patent Office in the corresponding European Patent Application No. 20882152.0.

* cited by examiner

*Primary Examiner* — Jane J Rhee
(74) *Attorney, Agent, or Firm* — KENJA IP LAW PC

(57) ABSTRACT

Provided is a binder composition for an all-solid-state secondary battery that can produce a slurry composition for an all-solid-state secondary battery having excellent dispersibility and preservation stability and that can cause a solid electrolyte-containing layer to display excellent ion conductivity. The binder composition contains a polymer, ions of a metal belonging to group 1 or group 2 of the periodic table, and a solvent. The solvent includes an organic solvent having a carbon number of 8 or more, and the content of the ions of the metal is not less than 5 mass ppm and not more than 5,000 mass ppm relative to the polymer.

10 Claims, No Drawings

BINDER COMPOSITION FOR ALL-SOLID-STATE SECONDARY BATTERY, SLURRY COMPOSITION FOR ALL-SOLID-STATE SECONDARY BATTERY, SOLID ELECTROLYTE-CONTAINING LAYER, AND ALL-SOLID-STATE SECONDARY BATTERY

TECHNICAL FIELD

The present disclosure relates to a binder composition for an all-solid-state secondary battery, a slurry composition for an all-solid-state secondary battery, a solid electrolyte-containing layer, and an all-solid-state secondary battery.

BACKGROUND

Demand for secondary batteries such as lithium ion secondary batteries has been increasing in recent years for various applications such as mobile information terminals, mobile electronic devices, and other mobile terminals, and also domestic small power storage devices, motorcycles, electric vehicles, and hybrid electric vehicles. The widespread use of secondary batteries in such applications has been accompanied by demand for further improvement of secondary battery safety.

For this reason, all-solid-state secondary batteries in which a solid electrolyte is used instead of an organic solvent electrolyte having high flammability and high danger of ignition upon leakage are attracting attention as secondary batteries having high safety. A solid electrolyte may be contained in an all-solid-state secondary battery in the form of a solid electrolyte-containing layer (electrode mixed material layer or solid electrolyte layer) in which components such as the solid electrolyte are bound to one another through a binder, for example.

The solid electrolyte-containing layer may be formed using a slurry composition for a solid electrolyte-containing layer that is produced using a binder composition that contains a polymer as a binder and a solvent.

For example, an electrode mixed material layer can be formed by removing a solvent from a slurry composition for an electrode mixed material layer that contains a binder composition, a solid electrolyte, and an electrode active material. Moreover, a solid electrolyte layer can be formed by removing a solvent from a slurry composition for a solid electrolyte layer that contains a binder composition and a solid electrolyte, for example.

Improvements have previously been made to binder compositions and techniques for forming solid electrolyte-containing layers using binder compositions in order to improve all-solid-state secondary battery performance (for example, refer to Patent Literature (PTL) 1 and 2).

CITATION LIST

Patent Literature

PTL 1: JP2010-205449A
PTL 2: JP2019-91632A

SUMMARY

Technical Problem

However, there is room for improvement of conventional binder compositions such as mentioned above in terms of increasing dispersibility and preservation stability of a slurry composition and also in terms of increasing ion conductivity of a solid electrolyte-containing layer formed using a slurry composition.

Accordingly, one object of the present disclosure is to provide a binder composition for an all-solid-state secondary battery that can produce a slurry composition for an all-solid-state secondary battery having excellent dispersibility and preservation stability and that can cause a solid electrolyte-containing layer to display excellent ion conductivity.

Another object of the present disclosure is to provide a slurry composition for an all-solid-state secondary battery that has excellent dispersibility and preservation stability and that can form a solid electrolyte-containing layer having excellent ion conductivity.

Yet another object of the present disclosure is to provide a solid electrolyte-containing layer that has excellent ion conductivity and an all-solid-state secondary battery that includes this solid electrolyte-containing layer.

Solution to Problem

The inventor conducted diligent investigation with the aim of solving the problem set forth above. The inventor reached a new finding that by using a binder composition that contains a polymer, ions of a specific metal, and a specific organic solvent and in which the content of the metal ions relative to the polymer is within a specific range, it is possible to sufficiently ensure dispersibility and preservation stability of a slurry composition while also causing a solid electrolyte-containing layer to display excellent ion conductivity. In this manner, the inventor completed the present disclosure.

Specifically, the present disclosure aims to advantageously solve the problem set forth above, and a presently disclosed binder composition for an all-solid-state secondary battery comprises: a polymer; ions of a metal belonging to group 1 or group 2 of the periodic table; and a solvent, wherein the solvent includes an organic solvent having a carbon number of 8 or more, and content of the ions of the metal is not less than 5 mass ppm and not more than 5,000 mass ppm relative to the polymer. By using a binder composition that contains a polymer, ions of a metal belonging to group 1 or group 2 of the periodic table (hereinafter, also referred to simply as "group 1 or 2 metal ions"), and a solvent, in which the amount of the group 1 or 2 metal ions relative to the polymer is within the range set forth above, and in which an organic solvent having a carbon number of 8 or more is contained as the solvent, it is possible to produce a slurry composition having excellent dispersibility and preservation stability and also to form a solid electrolyte-containing layer having excellent ion conductivity from this slurry composition for a secondary battery.

Note that the content of ions of a metal belonging to group 1 or group 2 of the periodic table relative to a polymer can be measured by inductively coupled plasma atomic emission spectroscopy (ICP-AES). More specifically, the aforementioned content can be measured by a method described in the EXAMPLES section.

In the presently disclosed binder composition for an all-solid-state secondary battery, the organic solvent having a carbon number of 8 or more preferably includes one or more selected from the group consisting of an aromatic hydrocarbon ring, a non-aromatic hydrocarbon group, and a carbonyl group. When the organic solvent having a carbon number of 8 or more includes at least any one of the structures set forth above, dispersibility and preservation stability of a slurry composition can be further improved while also even further increasing ion conductivity of a solid electrolyte-containing layer.

In the presently disclosed binder composition for an all-solid-state secondary battery, the polymer preferably includes either or both of a nitrogen-containing functional group and a carbonyl group. When the polymer includes at least either one of the functional groups set forth above, an effect of further improving dispersibility and preservation stability of a slurry composition and/or of improving adhesiveness of a solid electrolyte-containing layer can be obtained.

In the presently disclosed binder composition for an all-solid-state secondary battery, the polymer preferably includes a vinyl cyanide monomer unit in a proportion of not less than 2 mass % and not more than 35 mass %. When the polymer includes a vinyl cyanide monomer unit in the proportion set forth above, dispersibility and preservation stability of a slurry composition can be further improved.

As used in the present disclosure, the phrase "includes a monomer unit" means that "a polymer obtained with the monomer unit includes a structural unit derived from the monomer". Moreover, the proportional contents (mass %) of structural units (inclusive of "monomer units") in a polymer can be measured by a nuclear magnetic resonance (NMR) method such as $^1$H-NMR.

In the presently disclosed binder composition for an all-solid-state secondary battery, the polymer preferably includes a (meth)acrylic acid ester monomer unit that does not include an aromatic hydrocarbon ring in a proportion of not less than 25 mass % and not more than 95 mass %. When the polymer includes a (meth)acrylic acid ester monomer unit that does not include an aromatic hydrocarbon ring in the proportion set forth above, dispersibility and preservation stability of a slurry composition can be further improved while also increasing adhesiveness of a solid electrolyte-containing layer.

Note that in the present disclosure, "(meth)acryl" is used to indicate "acryl" and/or "methacryl".

In the presently disclosed binder composition for an all-solid-state secondary battery, the polymer preferably includes an aromatic monomer unit in a proportion of not less than 3 mass % and not more than 40 mass %. When the polymer includes an aromatic monomer unit in the proportion set forth above, dispersibility and preservation stability of a slurry composition can be further improved.

In the presently disclosed binder composition for an all-solid-state secondary battery, the aromatic monomer unit preferably includes a (meth)acrylic acid ester monomer unit that includes an aromatic hydrocarbon ring. When the polymer includes a (meth)acrylic acid ester monomer unit including an aromatic hydrocarbon ring as the aromatic monomer unit, adhesiveness of a solid electrolyte-containing layer can be improved.

Moreover, the present disclosure aims to advantageously solve the problem set forth above, and a presently disclosed slurry composition for an all-solid-state secondary battery comprises: a solid electrolyte; and any one of the binder compositions for an all-solid-state secondary battery set forth above. A slurry composition that contains a solid electrolyte and any one of the binder compositions set forth above has excellent dispersibility and preservation stability and can be used to form a solid electrolyte-containing layer having excellent ion conductivity.

In the presently disclosed slurry composition for an all-solid-state secondary battery, the solid electrolyte preferably includes either or both of a sulfide inorganic solid electrolyte and an oxide inorganic solid electrolyte. When a sulfide inorganic solid electrolyte and/or an oxide inorganic solid electrolyte is used as the solid electrolyte, ion conductivity of a solid electrolyte-containing layer can be further improved.

Furthermore, the present disclosure aims to advantageously solve the problem set forth above, and a presently disclosed solid electrolyte-containing layer is formed using any one of the slurry compositions for an all-solid-state secondary battery set forth above. A solid electrolyte-containing layer that is formed using any one of the slurry compositions set forth above has excellent ion conductivity.

Also, the present disclosure aims to advantageously solve the problem set forth above, and a presently disclosed all-solid-state secondary battery comprises the solid electrolyte-containing layer set forth above. An all-solid-state secondary battery that includes the solid electrolyte-containing layer set forth above has excellent cell characteristics such as output characteristics and cycle characteristics.

Advantageous Effect

According to the present disclosure, it is possible to provide a binder composition for an all-solid-state secondary battery that can produce a slurry composition for an all-solid-state secondary battery having excellent dispersibility and preservation stability and that can cause a solid electrolyte-containing layer to display excellent ion conductivity.

Moreover, according to the present disclosure, it is possible to provide a slurry composition for an all-solid-state secondary battery that has excellent dispersibility and preservation stability and that can form a solid electrolyte-containing layer having excellent ion conductivity.

Furthermore, according to the present disclosure, it is possible to provide a solid electrolyte-containing layer that has excellent ion conductivity and an all-solid-state secondary battery that includes this solid electrolyte-containing layer.

DETAILED DESCRIPTION

The following provides a detailed description of embodiments of the present disclosure.

The presently disclosed binder composition for an all-solid-state secondary battery is used in production of a slurry composition for an all-solid-state secondary battery. Moreover, the presently disclosed slurry composition for an all-solid-state secondary battery is used in formation of a solid electrolyte-containing layer, such as an electrode mixed material layer or a solid electrolyte layer, that is used in an all-solid-state secondary battery, such as an all-solid-state lithium ion secondary battery. Furthermore, the presently disclosed solid electrolyte-containing layer is formed using the presently disclosed slurry composition for an all-solid-state secondary battery. Also, the presently disclosed all-solid-state secondary battery includes the presently disclosed solid electrolyte-containing layer.

(Binder Composition for all-Solid-State Secondary Battery)

The presently disclosed binder composition contains a polymer, group 1 or 2 metal ions, and a solvent, and can optionally further contain other components. Features of the presently disclosed binder composition are that the content of the group 1 or 2 metal ions is not less than 5 mass ppm and not more than 5,000 mass ppm relative to the polymer and that the solvent includes an organic solvent having a carbon number of 8 or more.

As a result of the presently disclosed binder composition containing a polymer, group 1 or 2 metal ions, and a solvent, containing the group 1 or 2 metal ions in an amount that is within the range set forth above, and containing an organic solvent having a carbon number of 8 or more as the solvent, it is possible to provide a slurry composition for an all-solid-state secondary battery having excellent dispersibility and preservation stability and a solid electrolyte-containing layer having excellent ion conductivity by using this binder composition.

<Polymer>

The polymer may be any polymer without any specific limitations so long as it is a component that can bind components such as a solid electrolyte to one another in a solid electrolyte-containing layer formed from a slurry composition that has been produced using the binder composition (i.e., is a component that can function as a binder).

<<Chemical Composition>>

The polymer preferably includes either or both of a nitrogen-containing functional group and a carbonyl group (—C(=O)—), and preferably includes both a nitrogen-containing functional group and a carbonyl group. When the polymer includes a nitrogen-containing functional group, the polymer can adsorb well to a solid electrolyte, and dispersibility and preservation stability of a slurry composition can be further improved. Moreover, when the polymer includes a carbonyl group, flexibility of the polymer is ensured, and adhesiveness of a solid electrolyte-containing layer can be improved.

The nitrogen-containing functional group may, for example, be a nitrile group, an amino group, an imidazole group, a pyridine group, a carbazole group, or an amide group. Moreover, the polymer may include one type of nitrogen-containing functional group or may include two or more types of nitrogen-containing functional groups.

No specific limitations are placed on structural units included in the polymer. For example, the polymer preferably includes one or more selected from the group consisting of a vinyl cyanide monomer unit, a (meth)acrylic acid ester monomer unit that does not include an aromatic hydrocarbon ring, and an aromatic monomer unit. However, note that the polymer may include structural units other than the vinyl cyanide monomer unit, the (meth)acrylic acid ester monomer unit that does not include an aromatic hydrocarbon ring, and the aromatic monomer unit (i.e., other structural units).

[Vinyl Cyanide Monomer Unit]

Examples of vinyl cyanide monomers that can form the vinyl cyanide monomer unit include acrylonitrile, methacrylonitrile, α-chloroacrylonitrile, and α-ethylacrylonitrile. One of these vinyl cyanide monomers may be used individually, or two or more of these vinyl cyanide monomers may be used in combination. Of these vinyl cyanide monomers, acrylonitrile is preferable.

The proportion constituted by the vinyl cyanide monomer unit among all structural units included in the polymer when all structural units are taken to be 100 mass % is preferably 2 mass % or more, more preferably 3 mass % or more, even more preferably 4 mass % or more, and particularly preferably 6 mass % or more, and is preferably 35 mass % or less, more preferably 28 mass % or less, even more preferably 26 mass % or less, and particularly preferably 20 mass % or less. When the proportion constituted by the vinyl cyanide monomer unit among all structural units is 2 mass % or more, the polymer can adsorb well to a solid electrolyte, and dispersibility and preservation stability of a slurry composition can be further improved. On the other hand, when the proportion constituted by the vinyl cyanide monomer unit among all structural units is 35 mass % or less, the polymer can dissolve well in a solvent (particularly an organic solvent having a carbon number of 8 or more), and dispersibility and preservation stability of a slurry composition can be further improved.

[(Meth)Acrylic Acid Ester Monomer Unit not Including Aromatic Hydrocarbon Ring]

No specific limitations are placed on (meth)acrylic acid ester monomers that can form the (meth)acrylic acid ester monomer unit that does not include an aromatic hydrocarbon ring so long as they do not include an aromatic hydrocarbon ring. Examples of (meth)acrylic acid ester monomers that do not include an aromatic hydrocarbon ring include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, nonyl acrylate, decyl acrylate, lauryl acrylate, n-tetradecyl acrylate, stearyl acrylate, and 2-ethylhexyl acrylate; acrylic acid alkoxy esters such as 2-methoxyethyl acrylate and 2-ethoxyethyl acrylate; 2-(perfluoroalkyl) ethyl acrylates such as 2-(perfluorobutyl)ethyl acrylate and 2-(perfluoropentyl)ethyl acrylate; methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, nonyl methacrylate, decyl methacrylate, lauryl methacrylate, tridecyl methacrylate, n-tetradecyl methacrylate, stearyl methacrylate, and 2-ethylhexyl methacrylate; methacrylic acid alkoxy esters such as 2-methoxyethyl methacrylate and 2-ethoxyethyl methacrylate; and 2-(perfluoroalkyl) ethyl methacrylates such as 2-(perfluorobutyl)ethyl methacrylate and 2-(perfluoropentyl)ethyl methacrylate. The term "(meth)acrylic acid ester monomer" is also inclusive of diesters of α,β-ethylenically unsaturated dicarboxylic acids, examples of which include lower alkyl diesters of itaconic acid such as diethyl itaconate and dibutyl itaconate.

One of these (meth)acrylic acid ester monomers may be used individually, or two or more of these (meth)acrylic acid ester monomers may be used in combination. Of these (meth)acrylic acid ester monomers, methyl acrylate, ethyl acrylate, methyl methacrylate, butyl acrylate (n-butyl acrylate, t-butyl acrylate, etc.), and dibutyl itaconate are preferable.

The proportion constituted by the (meth)acrylic acid ester monomer unit that does not include an aromatic hydrocarbon ring among all structural units included in the polymer when all structural units are taken to be 100 mass % is preferably 25 mass % or more, more preferably 30 mass % or more, and even more preferably 35 mass % or more, and is preferably 95 mass % or less, more preferably 90 mass % or less, even more preferably 85 mass % or less, and particularly preferably 73 mass % or less. Flexibility of the polymer is ensured and adhesiveness of a solid electrolyte-containing layer can be improved when the proportion constituted by the (meth)acrylic acid ester monomer unit that does not include an aromatic hydrocarbon ring among all structural units is 25 mass % or more, whereas the polymer can adsorb well to an electrode active material or conductive material and thus dispersibility and preservation stability of a slurry composition can be further improved when the proportion constituted by the (meth)acrylic acid ester monomer unit that does not include an aromatic hydrocarbon ring among all structural units is 95 mass % or less.

[Aromatic Monomer Unit]

No specific limitations are placed on aromatic monomers that can form the aromatic monomer unit so long as they include an aromatic ring. An aromatic vinyl monomer or a (meth)acrylic acid ester monomer that includes an aromatic hydrocarbon ring may be used as an aromatic monomer.

The term "aromatic vinyl monomer" as used in the present disclosure is considered to not be inclusive of a monomer corresponding to a (meth)acrylic acid ester monomer that includes an aromatic hydrocarbon ring (i.e., the term "aromatic vinyl monomer unit" is not inclusive of a (meth)acrylic acid ester monomer unit including an aromatic hydrocarbon ring).

Examples of aromatic vinyl monomers include styrene, styrene sulfonic acid and salts thereof, α-methylstyrene, p-t-butylstyrene, butoxystyrene, vinyltoluene, chlorostyrene, and vinylnaphthalene.

The aromatic hydrocarbon ring that is included in a (meth)acrylic acid ester monomer unit including an aromatic hydrocarbon ring may be a benzene ring, naphthalene ring, or anthracene ring, for example, without any specific limitations. Of these aromatic hydrocarbon rings, a benzene ring is preferable. Note that the monomer unit may include one type of aromatic hydrocarbon ring or may include two or more types of aromatic hydrocarbon rings.

Examples of (meth)acrylic acid ester monomers including an aromatic hydrocarbon ring include phenoxyethyl (meth)acrylate, phenyl (meth)acrylate, ethoxylated o-phenylphenol (meth)acrylate, and phenoxypolyethylene glycol (meth)acrylate.

Note that in the present disclosure, "(meth)acrylate" is used to indicate "acrylate" and/or "methacrylate".

One of the aromatic monomers described above may be used individually, or two or more of the aromatic monomers described above may be used in combination. Of these aromatic monomers, styrene and phenoxyethyl acrylate are preferable from a viewpoint of causing good adsorption of the polymer to a solid electrolyte and further improving dispersibility and preservation stability of a slurry composition. Moreover, a (meth)acrylic acid ester monomer that includes an aromatic hydrocarbon ring is preferable, and phenoxyethyl acrylate is more preferable from a viewpoint of ensuring flexibility of the polymer and improving adhesiveness of a solid electrolyte-containing layer.

The proportion constituted by the aromatic monomer unit among all structural units included in the polymer when all structural units are taken to be 100 mass % is preferably 3 mass % or more, more preferably 5 mass % or more, even more preferably 7 mass % or more, and particularly preferably 10 mass % or more, and is preferably 40 mass % or less, more preferably 35 mass % or less, even more preferably 30 mass % or less, and particularly preferably 25 mass % or less. When the proportion constituted by the aromatic monomer unit among all structural units is 3 mass % or more, the polymer can adsorb well to a solid electrolyte, and dispersibility and preservation stability of a slurry composition can be further improved. On the other hand, when the proportion constituted by the aromatic monomer unit among all structural units is 40 mass % or less, the polymer can adsorb well to a solid electrolyte, and dispersibility and preservation stability of a slurry composition can be further improved while also increasing adhesiveness of a solid electrolyte-containing layer.

[Other Structural Units]

Examples of other structural units include, but are not specifically limited to, a diene monomer unit and a cross-linkable monomer unit. Note that the polymer may include just one type of other structural unit or may include two or more types of other structural units.

—Diene Monomer Unit—

Examples of diene monomers that can form the diene monomer unit include aliphatic conjugated diene monomers such as 1,3-butadiene, isoprene, 2,3-dimethyl-1,3-butadiene, and 1,3-pentadiene. One of these diene monomers may be used individually, or two or more of these diene monomers may be used in combination.

Note that the term "diene monomer unit" as used in the present disclosure is inclusive of a structural unit (hydrogenated unit) obtained through hydrogenation of a monomer unit included in a polymer that has been obtained using a diene monomer.

Of the diene monomers described above, 1,3-butadiene and isoprene are preferable. In other words, the diene monomer unit is preferably a 1,3-butadiene unit, an isoprene unit, a hydrogenated 1,3-butadiene unit, or a hydrogenated isoprene unit.

In a case in which the polymer includes a diene monomer unit, the proportion constituted by the diene monomer unit among all structural units included in the polymer when all structural units are taken to be 100 mass % is preferably 5 mass % or more, more preferably 6 mass % or more, and even more preferably 7 mass % or more, and is preferably 50 mass % or less, and more preferably 40 mass % or less. When the proportion constituted by the diene monomer unit among all structural units is 5 mass % or more, the polymer can adsorb well to an electrode active material or conductive material, and thus dispersibility and preservation stability of a slurry composition can be further improved. On the other hand, when the proportion constituted by the diene monomer unit among all structural units is 50 mass % or less, adhesiveness of a solid electrolyte-containing layer can be sufficiently ensured.

—Cross-Linkable Monomer Unit—

Cross-linkable monomers that can form the cross-linkable monomer unit are monomers having two or more polymerizable structures (olefinic double bonds, epoxy groups, etc.) per one molecule. For example, allyl (meth)acrylate, allyl glycidyl ether, or ethylene glycol di(meth)acrylate may be used as a cross-linkable monomer. One of these cross-linkable monomers may be used individually, or two or more of these cross-linkable monomers may be used in combination.

In a case in which the polymer includes a cross-linkable monomer unit, the proportion constituted by the cross-linkable monomer unit among all structural units included in the polymer when all structural units are taken to be 100 mass % can be set as 0.1 mass % or more, and is preferably 5 mass % or less, more preferably 4 mass % or less, and even more preferably 3 mass % or less.

<<Properties>>

The polymer may have good solubility or poor solubility in a solvent contained in a binder composition or slurry composition. In other words, the polymer may be dissolved in a solvent or may be dispersed in a solvent in a particulate form in a binder composition or slurry composition.

When a polymer is said to have "good solubility in a solvent" in the present disclosure, this means that the amount of solvent-insoluble content is less than 50 mass %, and when a polymer is said to have "poor solubility in a solvent" in the present disclosure, this means that the amount of solvent-insoluble content is 50 mass % or more.

Note that the "amount of solvent-insoluble content" can be measured by a method described in the EXAMPLES section. Moreover, the "amount of solvent-insoluble content" in the polymer can be adjusted by altering the types of monomers used to produce the polymer, the weight-average molecular weight of the polymer, and so forth. For example, the amount of solvent-insoluble content can be reduced by reducing the amount of a vinyl cyanide monomer and/or cross-linkable monomer used to produce the polymer.

The polymer preferably has good solubility in a solvent contained in a binder composition or slurry composition. When the polymer has good solubility in a solvent, a better dispersion state of a solid electrolyte and the like in a slurry composition can be achieved, and dispersibility and preservation stability of the slurry composition can be further improved. In addition, adhesiveness of a solid electrolyte-containing layer can be increased.

<<Production Method>>

No specific limitations are placed on the method by which the polymer is produced. For example, the polymer can be produced by polymerizing a monomer composition containing the monomers described above and then optionally performing hydrogenation.

Note that the proportional content of each monomer in the monomer composition can be set in accordance with the proportional content of each monomer unit in the polymer.

The method of polymerization is not specifically limited and may be any of solution polymerization, suspension polymerization, bulk polymerization, emulsion polymerization, and the like. A known emulsifier or polymerization initiator may be used in these polymerization methods as necessary. Although a non-ionic emulsifier such as polyoxyethylene lauryl ether may be used as an emulsifier, it is also possible to use an emulsifier that includes a group 1 or 2 metal ion such as sodium lauryl sulfate, sodium dodecylbenzenesulfonate, sodium dodecylbenzenesulfonate, sodium dodecyl diphenyl ether sulfonate, or sodium polyoxyethylene alkyl ether sulfate. By using an emulsifier that includes a group 1 or 2 metal ion, it is possible to mix group 1 or 2 metal ions into the resultant binder composition.

The method of hydrogenation is not specifically limited and may be a typical method using a catalyst (for example, refer to WO2012/165120A1, WO2013/080989A1, and JP2013-8485A).

<Ions of Metal Belonging to Group 1 or Group 2 of Periodic Table>

The presently disclosed binder composition contains group 1 or 2 metal ions. The inclusion of group 1 or 2 metal ions in the binder composition can improve ion conductivity of a solid electrolyte-containing layer. Although the reason for this is not clear, it is presumed that in a slurry composition and a solid electrolyte-containing layer, the group 1 or 2 metal ions adsorb to the surface of a solid electrolyte through electrostatic interactions or the like and cover the surface of the solid electrolyte, which thereby suppresses a reaction between water and the solid electrolyte and inhibits degradation of the solid electrolyte due to this reaction.

The group 1 or 2 metal ions may, for example, be sodium ions ($Na^+$), potassium ions ($K^+$), lithium ions ($Li^+$), magnesium ions ($Mg^{2+}$), or calcium ions ($Ca^{2+}$). One of these types of group 1 or 2 metal ions may be used individually, or two or more of these types of group 1 or 2 metal ions may be used in combination. Of these group 1 or 2 metal ions, sodium ions and lithium ions are more preferable from a viewpoint of increasing adhesiveness of a solid electrolyte-containing layer while also further improving ion conductivity of the solid electrolyte-containing layer.

The content of the group 1 or 2 metal ions in the binder composition is required to be not less than 5 mass ppm and not more than 5,000 mass ppm relative to the previously described polymer, is preferably 10 mass ppm or more, and more preferably 300 mass ppm or more relative to the polymer, and is preferably 4,500 mass ppm or less, and more preferably 3,000 mass ppm or less relative to the polymer. The above-described effect of improving ion conductivity of a solid electrolyte-containing layer cannot be sufficiently obtained when the content of the group 1 or 2 metal ions is less than 5 mass ppm relative to the polymer, whereas the metal ions may cause aggregation of a solid electrolyte, polymer, or the like and dispersibility and preservation stability of a slurry composition may be lost when the content of the group 1 or 2 metal ions is more than 5,000 mass ppm relative to the polymer.

No specific limitations are placed on the method by which the group 1 or 2 metal ions become contained in the binder composition. For example, the binder composition containing the group 1 or 2 metal ions can be produced by using an emulsifier that includes a group 1 or 2 metal ion such as previously described in production of the polymer or by adding a substance that can supply group 1 or 2 metal ions (group 1 or 2 hydroxide or the like) after production of the polymer. Moreover, the amount of group 1 or 2 metal ions contained in the obtained binder composition can be reduced by passing the polymer through an ion exchange resin, for example.

<Solvent>

The presently disclosed binder composition contains an organic solvent having a carbon number of 8 or more as a solvent. The inclusion of an organic solvent having a carbon number of 8 or more in the binder composition can improve dispersibility and preservation stability of a slurry composition produced using the binder composition, which is presumed to be due to inhibition of aggregation of the polymer, a solid electrolyte, or the like in the slurry composition. Moreover, an organic solvent having a carbon number of 8 or more has a low tendency to react with a solid electrolyte and has excellent handleability due to having a high boiling point.

Therefore, the use of an organic solvent having a carbon number of 8 or more as a solvent enables the formation of a solid electrolyte-containing layer that has a solid electrolyte and the like uniformly distributed therein and that has excellent ion conductivity.

<<Organic Solvent Having Carbon Number of 8 or More>>

The organic solvent having a carbon number of 8 or more preferably includes one or more selected from the group consisting of an aromatic hydrocarbon ring, a non-aromatic hydrocarbon group, and a carbonyl group from a viewpoint of further improving dispersibility and preservation stability of a slurry composition while also even further increasing ion conductivity of a solid electrolyte-containing layer.

The aromatic hydrocarbon ring may, for example, be a benzene ring, a naphthalene ring, or an anthracene ring. Note that the organic solvent having a carbon number of 8 or more may include just one type of aromatic hydrocarbon ring or may include two or more types of aromatic hydrocarbon rings.

The non-aromatic hydrocarbon group may, for example, be an alkyl group such as a methyl group, a propyl group (n-propyl group or isopropyl group), or a butyl group (n-butyl group, sec-butyl group, isobutyl group, or tert-butyl group). Note that the organic solvent having a carbon number of 8 or more may include just one type of non-aromatic hydrocarbon group or may include two or more types of non-aromatic hydrocarbon groups.

The carbon number of the organic solvent is required to be 8 or more as described above, and, from a viewpoint of further improving dispersibility and preservation stability of a slurry composition while also even further increasing ion conductivity of a solid electrolyte-containing layer, is preferably 12 or less, more preferably 10 or less, and most preferably 9.

More specifically, the organic solvent having a carbon number of 8 or more may be xylene (carbon number: 8), butyl butyrate (carbon number: 8), n-butyl ether (carbon number: 8), diisobutyl ketone (carbon number: 9), hexyl butyrate (carbon number: 10), or the like. One of these organic solvents may be used individually, or two or more of these organic solvents may be used in combination. Of these organic solvents, diisobutyl ketone is preferable from a viewpoint of further improving dispersibility of a slurry composition and ion conductivity of a solid electrolyte-containing layer.

<<Other Solvents>>

Note that the presently disclosed binder composition may contain solvents other than the above-described organic solvent having a carbon number of 8 or more (i.e., other solvents) as the solvent. An organic solvent having a carbon number of 7 or less can be used as another solvent such as mentioned above. More specifically, the organic solvent having a carbon number of 7 or less may be hexane, cyclopentane, cyclohexane, ethyl methyl ketone, cyclohexanone, ethyl acetate, butyl acetate, γ-butyrolactone, ε-caprolactone, acetonitrile, propionitrile, tetrahydrofuran, methanol, ethanol, isopropanol, ethylene glycol, ethylene glycol monomethyl ether, N-methylpyrrolidone, N,N-dimethylformamide, or the like. One of these organic solvents may be used individually, or two or more of these organic solvents may be used in combination.

However, from a viewpoint of sufficiently increasing dispersibility and preservation stability of a slurry composition and ion conductivity of a solid electrolyte-containing layer, the proportion constituted by the organic solvent having a carbon number of 8 or more in the solvent when the entire solvent is taken to be 100 mass % is preferably 50 mass % or more, more preferably 70 mass % or more, even more preferably 90 mass % or more, particularly preferably 95 mass % or more, and most preferably 100 mass % (i.e., another solvent is not substantially included).

<Other Components>

Examples of other components that can optionally be contained in the binder composition include, but are not specifically limited to, binders other than the polymer described above, dispersants, leveling agents, defoamers, conductive materials, and reinforcing materials. These other components are not specifically limited so long as they do not influence battery reactions.

Moreover, the binder composition may contain metal components other than the previously described group 1 or 2 metal ions (i.e., other metal components) as other components.

The other metal component may be a metal belonging to period 5 of the periodic table (palladium, ruthenium, rhodium, etc.). One other metal component may be used individually, or two or more other metal components may be used in combination.

In a case in which the binder composition contains one or more of palladium, ruthenium, and rhodium, the total amount thereof is preferably not less than 0.5 mass ppm and not more than 200 mass ppm relative to the polymer. When the total amount of palladium, ruthenium, and rhodium is within the range set forth above, electron conductivity of an all-solid-state secondary battery improves, and output characteristics improve. Moreover, when the total amount of palladium, ruthenium, and rhodium is 200 mass ppm or less, cycle characteristics of an all-solid-state secondary battery can be sufficiently improved.

Palladium, ruthenium, and rhodium may each originate from a compound such as a catalyst used in production of the polymer, for example, and thus may become contained in the binder composition. Alternatively, palladium, ruthenium, and rhodium may respectively become contained in the binder composition as a result of a palladium compound such as an organic complex or organic salt of palladium, a ruthenium compound such as an organic complex or organic salt of ruthenium, and a rhodium compound such as an organic complex or organic salt of rhodium being added to the binder composition.

Note that one of the other components described above may be used individually, or two or more of the other components described above may be used in combination in a freely selected ratio.

The content of other metal components such as described above can be measured by inductively coupled plasma atomic emission spectroscopy (ICP-AES). More specifically, the content thereof can be measured by a method described in the EXAMPLES section.

<Production Method of Binder Composition>

No specific limitations are placed on the method by which the presently disclosed binder composition is produced. For example, the binder composition can be produced by adding a substance that can supply group 1 or 2 metal ions, as necessary, to a water dispersion of the polymer serving as a binder that has been obtained as previously described, and then performing solvent exchange with the organic solvent having a carbon number of 8 or more. Note that addition of other components may be performed as necessary after solvent exchange, for example.

(Slurry Composition for all-Solid-State Secondary Battery)

The presently disclosed slurry composition for an all-solid-state secondary battery contains at least a solid electrolyte and the presently disclosed binder composition for an all-solid-state secondary battery set forth above. More specifically, the presently disclosed slurry composition contains a solid electrolyte, the previously described polymer and group 1 or 2 metal ions, and a solvent that includes an organic solvent having a carbon number of 8 or more, and optionally contains an electrode active material and other components. The presently disclosed slurry composition has excellent dispersibility and preservation stability and can be used to form a solid electrolyte-containing layer having excellent ion conductivity as a result of containing the presently disclosed binder composition.

<Solid Electrolyte>

The solid electrolyte is not specifically limited so long as it is particles formed of a solid that displays ion conductivity, but the use of an inorganic solid electrolyte is preferable.

The inorganic solid electrolyte may be a crystalline inorganic ion conductor, an amorphous inorganic ion conductor, or a mixture thereof without any specific limitations. For example, in a case in which the all-solid-state secondary battery is an all-solid-state lithium ion secondary battery, a crystalline inorganic lithium ion conductor, an amorphous inorganic lithium ion conductor, or a mixture thereof can normally be used as the inorganic solid electrolyte. In particular, it is preferable that the inorganic solid electrolyte includes either or both of a sulfide inorganic solid electrolyte and an oxide inorganic solid electrolyte from a viewpoint of forming a solid electrolyte-containing layer having even better ion conductivity.

Although the following describes, as one example, a case in which the slurry composition for an all-solid-state secondary battery is a slurry composition for an all-solid-state lithium ion secondary battery, the presently disclosed slurry composition for an all-solid-state secondary battery is not limited to the following example.

Examples of crystalline inorganic lithium ion conductors include $Li_3N$, LISICON ($Li_{14}Zn(GeO_4)_4$), perovskite-type lithium ion conductors (for example, $Li_{0.5}La_{0.5}TiO_3$), garnet-type lithium ion conductors (for example, $Li_7La_3Zr_2O_{12}$), LIPON ($Li_{3+y}PO_{4-x}N_x$), and Thio-LISICON ($Li_{3.25}Ge_{0.25}P_{0.75}S_4$).

The crystalline inorganic lithium ion conductors described above can be used individually or as a mixture of two or more types.

The amorphous inorganic lithium ion conductor may, for example, be a sulfur atom-containing substance that displays ion conductivity. More specific examples include glass Li—Si—S—O, Li—P—S, and an amorphous inorganic lithium ion conductor obtained using a raw material composition containing $Li_2S$ and a sulfide of an element belonging to any one of groups 13 to 15 of the periodic table.

The element belonging to any one of groups 13 to 15 may be Al, Si, Ge, P, As, Sb, or the like, for example. Moreover, the sulfide of the element belonging to any one of groups 13 to 15 may, more specifically, be $Al_2S_3$, $SiS_2$, $GeS_2$, $P_2S_3$, $P_2S_5$, $As_2S_3$, $Sb_2S_3$, or the like. The method by which the amorphous inorganic lithium ion conductor is synthesized using the raw material composition may be an amorphization method such as mechanical milling or melt quenching, for example. The amorphous inorganic lithium ion conductor that is obtained using the raw material composition containing $Li_2S$ and the sulfide of the element belonging to any one of groups 13 to 15 of the periodic table is preferably $Li_2S$—$P_2S_5$, $Li_2S$—$SiS_2$, $Li_2S$—$GeS_2$, or $Li_2S$—$Al_2S_3$, and more preferably $Li_2S$—$P_2S_5$.

The amorphous inorganic lithium ion conductors described above can be used individually or as a mixture of two or more types.

Of the examples described above, an amorphous sulfide containing Li and P or $Li_7La_3Zr_2O_{12}$ is preferable as an inorganic solid electrolyte for an all-solid-state lithium ion secondary battery from a viewpoint of forming a solid electrolyte-containing layer having even better ion conductivity. As a result of having high lithium ion conductivity, an amorphous sulfide containing Li and P or $Li_7La_3Zr_2O_{12}$ can reduce the internal resistance of a battery and improve output characteristics of the battery when used as the inorganic solid electrolyte.

The amorphous sulfide containing Li and P is more preferably sulfide glass formed of $Li_2S$ and $P_2S_5$, and particularly preferably sulfide glass produced from a mixed raw material of $Li_2S$ and $P_2S_5$ in which the molar ratio of $Li_2S:P_2S_5$ is 65:35 to 85:15 from a viewpoint of reducing internal resistance and improving output characteristics of a battery. Moreover, the amorphous sulfide containing Li and P is preferably sulfide glass-ceramic that is obtained by reacting a mixed raw material of $Li_2S$ and $P_2S_5$ in which the molar ratio of $Li_2S:P_2S_5$ is 65:35 to 85:15 by a mechanochemical method. The molar ratio of $Li_2S:P_2S_5$ in the mixed raw material is preferably 68:32 to 80:20 from a viewpoint of maintaining a state of high lithium ion conductivity.

Note that the inorganic solid electrolyte may contain one or more sulfides selected from the group consisting of $Al_2S_3$, $B_2S_3$, and $SiS_2$ as a starting material other than $Li_2S$ and $P_2S_5$ to the extent that ion conductivity is not reduced. The addition of such a sulfide can stabilize a glass component in the inorganic solid electrolyte.

In the same manner, the inorganic solid electrolyte may contain one or more ortho-oxoacid lithium salts selected from the group consisting of $Li_3PO_4$, $Li_4SiO_4$, $Li_4GeO_4$, $Li_3BO_3$, and $Li_3AlO_3$, in addition to $Li_2S$ and $P_2S_5$. The inclusion of such an ortho-oxoacid lithium salt can stabilize a glass component in the inorganic solid electrolyte.

The solid electrolytes described above can be used individually or as a mixture of two or more types. Moreover, the particle diameter of the solid electrolyte described above can be the same as that of a conventionally used solid electrolyte without any specific limitations.

<Binder Composition>

The binder composition used to produce the slurry composition is the presently disclosed binder composition set forth above that contains a polymer, group 1 or 2 metal ions, and a solvent including an organic solvent having a carbon number of 8 or more, and that optionally contains other components.

No specific limitations are placed on the mixing ratio of the solid electrolyte and the binder composition.

For example, the amount of polymer originating from the binder composition that is contained in the slurry composition is preferably 0.1 parts by mass or more, more preferably 0.2 parts by mass or more, and even more preferably 0.3 parts by mass or more per 100 parts by mass of the solid electrolyte, and is preferably 10 parts by mass or less, more preferably 8 parts by mass or less, and even more preferably 5 parts by mass or less per 100 parts by mass of the solid electrolyte. When the content of the polymer in the slurry composition is 0.1 parts by mass or more per 100 parts by mass of the solid electrolyte, the polymer can display sufficient function as a binder while also further increasing dispersibility and preservation stability of the slurry composition. In addition, ion conductivity of a solid electrolyte-containing layer can be even further improved, and cell characteristics of an all-solid-state battery can be enhanced. On the other hand, when the content of the polymer in the slurry composition is 10 parts by mass or less per 100 parts by mass of the solid electrolyte, ion conductivity of a solid electrolyte-containing layer can be sufficiently ensured, and excessive loss of cell characteristics of an all-solid-state secondary battery does not occur.

<Electrode Active Material>

The electrode active material is a material that gives and receives electrons in an electrode of an all-solid-state secondary battery. For example, in a case in which the all-solid-state secondary battery is an all-solid-state lithium ion secondary battery, a material that can occlude and release lithium is normally used as the electrode active material.

Although the following describes, as one example, a case in which the slurry composition for an all-solid-state secondary battery is a slurry composition for an all-solid-state lithium ion secondary battery, the presently disclosed slurry composition for an all-solid-state secondary battery is not limited to the following example.

A positive electrode active material formed of an inorganic compound or a positive electrode active material formed of an organic compound may be used as a positive electrode active material for an all-solid-state lithium ion secondary battery without any specific limitations. Note that the positive electrode active material may be a mixture of an inorganic compound and an organic compound.

The positive electrode active material formed of an inorganic compound may be a transition metal oxide, a complex oxide of lithium and a transition metal (lithium-containing complex metal oxide), a transition metal sulfide, or the like, for example. The aforementioned transition metal may be Fe, Co, Ni, Mn, or the like. Specific examples of inorganic compounds that may be used in the positive electrode active material include lithium-containing complex metal oxides such as $LiCoO_2$ (lithium cobalt oxide), $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may have undergone partial element substitution.

The positive electrode active materials formed of inorganic compounds described above may be used individually or as a mixture of two or more types.

The positive electrode active material formed of an organic compound may be polyaniline, polypyrrole, a polyacene, a disulfide compound, a polysulfide compound, an N-fluoropyridinium salt, or the like, for example.

The positive electrode active materials formed of organic compounds described above may be used individually or as a mixture of two or more types.

Allotropes of carbon such as graphite and coke may be used as a negative electrode active material for an all-solid-state lithium ion secondary battery. Note that a negative electrode active material formed of an allotrope of carbon can be used in a mixed or coated form with a metal, metal salt, oxide, or the like. Examples of negative electrode active materials that can be used also include oxides and sulfates of silicon, tin, zinc, manganese, iron, nickel, and the like; lithium metal; lithium alloys such as Li—Al, Li—Bi—Cd, and Li—Sn—Cd; lithium transition metal nitrides; and silicone.

The negative electrode active materials described above can be used individually or as a mixture of two or more types.

Moreover, the particle diameter of the electrode active material (positive electrode active material or negative electrode active material) described above can be the same as that of a conventionally used electrode active material without any specific limitations. Furthermore, the amount of the electrode active material described above in the slurry composition can be the same as that of a conventionally used electrode active material without any specific limitations.

<Production of Slurry Composition>

The slurry composition for an all-solid-state secondary battery set forth above can be obtained by mixing the components described above by any mixing method, for example, without any specific limitations.

(Solid Electrolyte-Containing Layer)

The presently disclosed solid electrolyte-containing layer is a layer that contains a solid electrolyte and may, for example, be an electrode mixed material layer (positive electrode mixed material layer or negative electrode mixed material layer) that gives and receives electrons through electrochemical reactions, a solid electrolyte layer disposed between a positive electrode mixed material layer and a negative electrode mixed material layer that are in opposition to each other, or the like.

Moreover, the presently disclosed solid electrolyte-containing layer is a layer that is formed using the slurry composition for an all-solid-state secondary battery set forth above and can be formed by, for example, applying the slurry composition set forth above onto the surface of a suitable substrate to form a coating film, and subsequently drying the coating film that has been formed. In other words, the presently disclosed solid electrolyte-containing layer is formed of a dried product of the slurry composition set forth above, normally contains a solid electrolyte, a polymer, and ions of a metal belonging to group 1 or group 2 of the periodic table (and/or an ionically bonded compound formed of an ion of that metal (cation) and an anion), and can optionally further contain one or more selected from the group consisting of an electrode active material and other components. Note that components contained in the solid electrolyte-containing layer are components that were contained in the slurry composition set forth above and the content ratio of these components is normally the same as the content ratio thereof in the slurry composition.

The presently disclosed solid electrolyte-containing layer can display excellent ion conductivity as a result of being formed from the presently disclosed slurry composition for an all-solid-state secondary battery.

<Substrate>

No limitations are placed on the substrate onto which the slurry composition is applied. For example, a coating film of the slurry composition may be formed on the surface of a releasable substrate, the coating film may be dried to form a solid electrolyte-containing layer, and then the releasable substrate may be peeled from the solid electrolyte-containing layer. The solid electrolyte-containing layer that has been peeled from the releasable substrate in this manner can be used as a free-standing film to form a battery member (for example, an electrode or a solid electrolyte layer) of an all-solid-state secondary battery.

However, it is preferable to use a current collector or an electrode as the substrate from a viewpoint of increasing battery member production efficiency through omission of a step of peeling the solid electrolyte-containing layer. More specifically, in a situation in which an electrode mixed material layer is to be produced, the slurry composition is preferably applied onto a current collector serving as a substrate. Moreover, in a situation in which a solid electrolyte layer is to be produced, the slurry composition is preferably applied onto an electrode (positive electrode or negative electrode).

<<Current Collector>>

The current collector is a material having electrical conductivity and electrochemical durability. Specifically, the current collector may, for example, be made of iron, copper, aluminum, nickel, stainless steel, titanium, tantalum, gold, platinum, or the like. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

<<Electrode>>

The electrode (positive electrode or negative electrode) is not specifically limited and may be an electrode that is obtained by forming an electrode mixed material layer containing an electrode active material, a solid electrolyte, and a binder on a current collector such as described above.

The electrode active material, solid electrolyte, and binder contained in the electrode mixed material layer of the electrode are not specifically limited, and known examples thereof can be used. Note that the electrode mixed material layer of the electrode may be a layer that corresponds to the presently disclosed solid electrolyte-containing layer.

<Formation Method of Solid Electrolyte-Containing Layer>

Examples of methods by which the solid electrolyte-containing layer may be formed on a substrate such as the current collector or electrode described above include:

(1) a method in which the presently disclosed slurry composition is applied onto the surface of a substrate (surface at the electrode mixed material layer-side in the case of an electrode; same applies below) and is then dried;
(2) a method in which a substrate is immersed in the presently disclosed slurry composition and is then dried; and
(3) a method in which the presently disclosed slurry composition is applied onto a releasable substrate and is dried to produce a solid electrolyte-containing layer that is then transferred onto the surface of an electrode or the like.

Of these methods, method (1) is particularly preferable since it allows simple control of the thickness of the solid electrolyte-containing layer. In more detail, method (1) includes a step of applying the slurry composition onto a substrate (application step) and a step of drying the slurry composition that has been applied onto the substrate to form a solid electrolyte-containing layer (solid electrolyte-containing layer formation step).

<<Application Step>>

Examples of methods by which the slurry composition may be applied onto the substrate in the application step include, but are not specifically limited to, doctor blading, reverse roll coating, direct roll coating, gravure coating, extrusion coating, and brush coating.

<<Solid Electrolyte-Containing Layer Formation Step>>

The method by which the slurry composition on the substrate is dried in the solid electrolyte-containing layer formation step may be any commonly known method without any specific limitations.

Examples of drying methods that may be used include drying by warm, hot, or low-humidity air, drying in a vacuum, and drying by irradiation with infrared light, electron beams, or the like.

In a case in which the solid electrolyte-containing layer is an electrode mixed material layer, the solid electrolyte-containing layer is preferably subjected to a pressing process by roll pressing or the like after drying. The pressing process enables further densification of the obtained electrode mixed material layer.

(Electrode)

An electrode that is obtained by forming an electrode mixed material layer on a current collector using the presently disclosed slurry composition for an all-solid-state secondary battery includes an electrode mixed material layer that contains a solid electrolyte, a polymer, and ions of a metal belonging to group 1 or group 2 of the periodic table (and/or an ionically bonded compound formed of an ion of that metal (cation) and an anion) and that can optionally further contain one or more selected from the group consisting of an electrode active material and other components, and this electrode can display excellent ion conductivity.

(Solid Electrolyte Layer)

A solid electrolyte layer that is formed using the presently disclosed slurry composition for an all-solid-state secondary battery contains a solid electrolyte, a polymer, and ions of a metal belonging to group 1 or group 2 of the periodic table (and/or an ionically bonded compound formed of an ion of that metal (cation) and an anion) and optionally further contains other components, and this solid electrolyte layer can display excellent ion conductivity.

(All-Solid-State Secondary Battery)

The presently disclosed all-solid-state secondary battery includes the presently disclosed solid electrolyte-containing layer set forth above. For example, the presently disclosed all-solid-state secondary battery may include a positive electrode, a solid electrolyte layer, and a negative electrode, and may have the presently disclosed solid electrolyte-containing layer as at least one of a positive electrode mixed material layer of the positive electrode, a negative electrode mixed material layer of the negative electrode, and the solid electrolyte layer. In other words, the presently disclosed all-solid-state secondary battery includes at least one of: a positive electrode including a positive electrode mixed material layer that is formed using a slurry composition for an all-solid-state secondary battery positive electrode serving as the presently disclosed slurry composition for an all-solid-state secondary battery; a negative electrode including a negative electrode mixed material layer that is formed using a slurry composition for an all-solid-state secondary battery negative electrode serving as the presently disclosed slurry composition for an all-solid-state secondary battery; and a solid electrolyte layer that is formed using a slurry composition for an all-solid-state secondary battery electrolyte layer serving as the presently disclosed slurry composition for an all-solid-state secondary battery.

The presently disclosed all-solid-state secondary battery has excellent cell characteristics such as output characteristics and cycle characteristics as a result of including the presently disclosed solid electrolyte-containing layer.

Note that any electrode for an all-solid-state secondary battery can be used in the presently disclosed all-solid-state secondary battery as an electrode for an all-solid-state secondary battery including an electrode mixed material layer that does not correspond to the presently disclosed solid electrolyte-containing layer without any specific limitations so long as it includes an electrode mixed material layer that does not correspond to the presently disclosed solid electrolyte-containing layer.

Moreover, any solid electrolyte layer such as a solid electrolyte layer described in JP2012-243476A, JP2013-143299A, JP2016-143614A, or the like can be used without any specific limitations in the presently disclosed all-solid-state secondary battery as a solid electrolyte layer that does not correspond to the presently disclosed solid electrolyte-containing layer.

The presently disclosed all-solid-state secondary battery can be obtained by stacking the positive electrode and the negative electrode such that the positive electrode mixed material layer of the positive electrode and the negative electrode mixed material layer of the negative electrode are in opposition via the solid electrolyte layer, optionally performing pressing to obtain a laminate, subsequently placing the laminate in a battery container in that form or after rolling, folding, or the like in accordance with the battery shape, and then sealing the battery container. Note that an expanded metal, an overcurrent preventing device such as a fuse or a PTC device, a lead plate, or the like may be placed in the battery container as necessary in order to prevent pressure increase inside the battery and occurrence of overcharging or overdischarging. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, the following methods were used in the examples and comparative examples to measure or evaluate the chemical composition and amount of solvent-insoluble content of a polymer, the content of metal components (group 1 or 2 metal ions and other metal components) in a binder composition, the dispersibility and preservation stability of a slurry composition, the adhesiveness of a positive electrode mixed material layer, the ion conductivity of a solid electrolyte layer, and the output characteristics of an all-solid-state secondary battery.

<Chemical Composition>

After coagulating 100 g of a binder composition containing a polymer in 1 L of methanol, 12 hours of vacuum drying was performed at a temperature of 60° C. The obtained dry polymer was analyzed by $^1$H-NMR. The proportional content (mass %) of each monomer unit or structural unit included in the polymer was calculated based on the obtained analysis values.

<Amount of Solvent-Insoluble Content>

A water dispersion of a polymer was dried in an environment of 50% humidity and 23° C. to 25° C. to produce a film having a thickness of 3±0.3 mm. Next, the produced film was cut up into 5 mm squares so as to prepare film pieces. Approximately 1 g of these film pieces were precisely weighed, and the weight of the precisely weighed film pieces was taken to be W0. The precisely weighed film pieces were immersed in 100 g of a binder composition solvent (temperature 25° C.) for 24 hours. After 24 hours of immersion, the film pieces were pulled out of the solvent, the pulled-out film pieces were vacuum dried at 105° C. for 3 hours, and the weight of these film pieces (weight of insoluble content) W1 was precisely weighed. The amount of solvent-insoluble content (%) was calculated by the following formula.

Amount of solvent-insoluble content (%)=$W1/W0 \times 100$

<Content of Metal Components>

Approximately 1 g of a binder composition was heated in a 550° C. electric furnace for approximately 3 hours so as to incinerate the binder composition. Subsequently, approximately 5 mL of concentrated sulfuric acid was added to the incinerated binder composition, dissolution was performed, and then approximately 5 mL of concentrated nitric acid was gradually added in order to perform wet decomposition. After this decomposition, the acid was concentrated, was made up to a volume of 10 mL with ultrapure water, and then the metal ion concentration in the binder composition was measured using an ICP-AES apparatus (produced by SII NanoTechnology Inc.; model no.: SPS-5100). Based on values obtained for the metal ion concentration, the content of group 1 or 2 metal ions and the content of palladium, ruthenium, and rhodium relative to the polymer were calculated.

<Dispersibility>

The viscosity of a slurry composition for a solid electrolyte layer was measured by a Brookfield B-type viscometer at 60 rpm (25° C.) and was evaluated by the following standard. A smaller slurry composition viscosity indicates better dispersion of a solid electrolyte contained in the slurry composition.

A: Viscosity of less than 4,000 mPa·s
B: Viscosity of not less than 4,000 mPa·s and less than 5,500 mPa·s
C: Viscosity of not less than 5,500 mPa·s and less than 8,000 mPa·s
D: Viscosity of not less than 8,000 mPa·s or not dispersed (no fluidity)

<Preservation Stability>

A portion of a slurry composition (slurry composition for a solid electrolyte layer or slurry composition for a positive electrode mixed material layer) was sampled straight after production. Solvent was removed from the sampled slurry composition through 1 hour of drying on a 130° C. hot plate in order to measure the initial solid content concentration of the slurry composition.

Next, the slurry composition was preserved in a tightly sealed state at 25° C. An upper portion of the preserved slurry composition was sampled at intervals of 1 day (24 hours) up until 6 days had passed, and the solid content concentration was measured by the same method as described above. The number of days of preservation after which the solid content concentration had decreased by at least 1.0% from the initial solid content concentration was recorded and was evaluated by the following standard. A greater number of days indicates that solid content in the slurry composition has a lower tendency to sediment and that the slurry composition has better preservation stability.

A: Reduction of solid content concentration not observed even after 6 days of preservation
B: Reduction of solid content concentration observed after 4 or 5 days of preservation
C: Reduction of solid content concentration observed after 2 or 3 days of preservation
D: Reduction of solid content concentration observed after 1 day of preservation <Adhesiveness>

A rectangle of 1.0 cm in width by 10 cm in length was cut out from a positive electrode as a test specimen. Cellophane tape (tape prescribed by JIS Z1522) was affixed to the surface at the positive electrode mixed material layer-side of the test specimen, the cellophane tape was subsequently peeled off in a direction at 180° from one end of the test specimen at a speed of 50 mm/min, and the stress during this peeling was measured. A total of three measurements were made in this manner. An average value of these measurements was determined, was taken to be the peel strength (N/m), and was evaluated by the following standard. A larger peel strength indicates better adhesiveness of the positive electrode mixed material layer and indicates stronger close adherence with the current collector.

A+: Peel strength of 4 N/m or more
A: Peel strength of not less than 3 N/m and less than 4 N/m
B: Peel strength of not less than 2 N/m and less than 3 N/m
C: Peel strength of not less than 1 N/m and less than 2 N/m
D: Peel strength of less than 1 N/m <Ion Conductivity>

First, a slurry composition for a solid electrolyte layer was dried by a 130° C. hot plate inside a glovebox (moisture content: 1 ppm or less), and the resultant powder was shaped into a circular tube shape of 10 mm in diameter and 1 mm in thickness to obtain a measurement sample. Measurement of Li ion conductivity (25° C.) for the measurement sample was performed by the alternating current impedance method. This measurement was performed using a frequency response analyzer (produced by Solartron Analytical; product name: Solartron® 1260 (Solartron is a registered trademark in Japan, other countries, or both)) under measurement conditions of an applied voltage of 10 mV and a measurement frequency range of 0.01 MHz to 1 MHz. The obtained Li ion conductivity was taken to be $S_0$.

Separately to the above, the slurry composition was dried by a 130° C. hot plate inside a dry room (moisture content: 127 ppm or less; equivalent to dew point of −40° C.), and the resultant powder was shaped into a circular tube shape of 10 mm in diameter and 0.5 mm in thickness to obtain a measurement sample. Li ion conductivity (25° C.) was measured for this measurement sample in the same way as for $S_0$ described above. The obtained Li ion conductivity was taken to be $S_1$.

The conductivity maintenance rate ($=S_1/S_0 \times 100(\%)$) was determined and was evaluated by the following standard. A larger conductivity maintenance rate can be said to mean that degradation of the solid electrolyte by moisture is inhibited and indicates that a solid electrolyte-containing layer produced using the slurry composition can display better ion conductivity.

A: Conductivity maintenance rate of 90% or more
B: Conductivity maintenance rate of not less than 80% and less than 90%
C: Conductivity maintenance rate of not less than 50% and less than 80%
D: Conductivity maintenance rate of not less than 30% and less than 50%
E: Conductivity maintenance rate of less than 30%<

<Output Characteristics>

Three all-solid-state secondary battery cells were charged to 4.2 V by a 0.1 C constant-current method, were subsequently discharged to 3.0 V at 0.1 C, and the 0.1 C discharge capacity was determined. Next, charging was performed to 4.2 V at 0.1 C, discharging was subsequently performed to 3.0 V at 2 C, and the 2 C discharge capacity was determined. An average value of the 0.1 C discharge capacity for the three cells was taken to be discharge capacity (a) and an average value of the 2 C discharge capacity for the three cells was taken to be discharge capacity (b). A ratio (capacity ratio) of the discharge capacity (b) relative to the discharge capacity (a) was calculated (=discharge capacity (b)/discharge capacity (a)×100(%)) and was evaluated by the following standard. A larger value for the capacity ratio indicates that the all-solid-state secondary battery has better output characteristics.

A+: Capacity ratio of 85% or more
A: Capacity ratio of not less than 80% and less than 85%
B: Capacity ratio of not less than 70% and less than 80%
C: Capacity ratio of not less than 60% and less than 70%
D: Capacity ratio of less than 60%

Example 1

<Production of Binder Composition>

A 1 L septum-equipped flask that included a stirrer was charged with 100 parts of deionized water and 0.2 parts of sodium lauryl sulfate as an emulsifier, the gas phase was purged with nitrogen gas, and the temperature was raised to 60° C. Thereafter, 0.25 parts of ammonium persulfate as a polymerization initiator was dissolved in 20.0 parts of deionized water and was added into the flask.

Meanwhile, a monomer composition was obtained in a separate vessel by mixing 40 parts of deionized water, 1.0 parts of sodium lauryl sulfate as an emulsifier, and 6 parts of acrylonitrile, 69 parts of butyl acrylate, and 25 parts of styrene as monomers. The monomer composition was continuously added into the 1 L septum-equipped flask over 3 hours to perform polymerization. The reaction was carried out at 60° C. during addition. Once the addition was complete, a further 3 hours of stirring was performed at 80° C. to complete the reaction. The resultant water dispersion of a polymer was used to measure the amount of diisobutyl ketone (solvent) insoluble content in the polymer and to determine whether the polymer had good solubility or poor solubility in diisobutyl ketone. The result is shown in Table 1.

Next, an appropriate amount of sodium hydroxide was added to the obtained water dispersion of the polymer, and then an appropriate amount of diisobutyl ketone was further added as a solvent so as to obtain a mixture. Thereafter, distillation was performed under reduced pressure at 80° C. to remove water and excess diisobutyl ketone from the mixture, and thereby obtain a binder composition (solid content concentration: 8%). The obtained binder composition was used to measure the chemical composition of the polymer. The content of metal components in the binder composition was also measured. Each of the results is shown in Table 1.

<Production of Slurry Composition for Positive Electrode Mixed Material Layer>

After mixing 70 parts of lithium cobalt oxide (number-average particle diameter: 11.5 μm) as a positive electrode active material, 25.5 parts of sulfide glass formed of $Li_2S$ and $P_2S_5$ ($Li_2S/P_2S_5$=70 mol %/30 mol %; number-average particle diameter: 0.9 μm) as a solid electrolyte, 2.5 parts of acetylene black as a conductive material, and 2 parts (in terms of solid content) of the binder composition obtained as described above and then further adding diisobutyl ketone as a solvent so as to adjust the solid content concentration to 80%, these materials were mixed for 60 minutes in a planetary mixer. Diisobutyl ketone was subsequently further added so as to adjust the solid content concentration to 70%, and then 10 minutes of mixing was performed to produce a slurry composition for a positive electrode mixed material layer. The preservation stability of the obtained slurry composition for a positive electrode mixed material layer was evaluated. The result is shown in Table 1.

<Production of Slurry Composition for Solid Electrolyte Layer>

A composition having a solid content concentration of 80% was produced by mixing 100 parts of sulfide glass formed of $Li_2S$ and $P_2S_5$ ($Li_2S/P_2S_5$=70 mol %/30 mol %; number-average particle diameter: 0.9 μm) as a solid electrolyte and 2 parts (in terms of solid content) of the binder composition obtained as described above and then adding diisobutyl ketone to the resultant mixture. This composition was mixed for 2 minutes at 2,000 rpm using a planetary centrifugal mixer (product name: THINKY MIXER® ARE310 (THINKY MIXER is a registered trademark in Japan, other countries, or both); same applies below). Diisobutyl ketone was then added to the obtained mixture to produce a composition having a solid content concentration of 70%. This composition was mixed for 2 minutes at 2,000 rpm using the planetary centrifugal mixer. Diisobutyl ketone was then added to the obtained mixture to produce a composition having a solid content concentration of 65%. This composition was mixed for 2 minutes at 2,000 rpm using the planetary centrifugal mixer. Diisobutyl ketone was then added to the obtained mixture to produce a composition having a solid content concentration of 60%. This composition was mixed for 2 minutes at 2,000 rpm using the planetary centrifugal mixer. Diisobutyl ketone was then added to the obtained mixture to produce a composition having a solid content concentration of 55%. This composition was mixed for 2 minutes at 2,000 rpm using the planetary centrifugal mixer. Diisobutyl ketone was then added to the obtained mixture to produce a composition having a solid content concentration of 50%. This composition was mixed for 2 minutes at 2,000 rpm using the planetary centrifugal mixer so as to obtain a slurry composition for a solid electrolyte layer. The dispersibility and preservation stability of the obtained slurry composition for a solid electrolyte layer were evaluated. The obtained slurry composition for a solid electrolyte layer was also used to evaluate the ion conductivity of a solid electrolyte layer. Each of the results is shown in Table 1.

<Production of Positive Electrode>

The slurry composition for a positive electrode mixed material layer was applied onto the surface of a current collector (aluminum foil; thickness: 20 μm) and was dried (120° C., 60 minutes) so as to form a positive electrode mixed material layer of 50 μm in thickness, and thereby obtain a positive electrode. This positive electrode was used to evaluate adhesiveness of the positive electrode mixed material layer. The result is shown in Table 1.

<Production of all-Solid-State Secondary Battery>

After mixing 65 parts of graphite (number-average particle diameter: 20 μm) as a negative electrode active material, 31.5 parts of sulfide glass formed of $Li_2S$ and $P_2S_5$ ($Li_2S/P_2S_5$=70 mol %/30 mol %; number-average particle diameter: 0.9 μm) as solid electrolyte particles, 1.5 parts of acetylene black as a conductive material, and 2 parts (in terms of solid content) of the binder composition obtained as described above and then further adding diisobutyl ketone as a solvent so as to adjust the solid content concentration to 65%, these materials were mixed for 60 minutes in a planetary mixer. Diisobutyl ketone was subsequently further added to adjust the solid content concentration to 60%, and then mixing was performed in the planetary mixer to produce a slurry composition for a negative electrode mixed material layer. The slurry composition for a negative electrode mixed material layer was applied onto the surface of a current collector (copper foil; thickness: 15 μm) and was dried (120° C., 60 minutes) so as to form a negative electrode mixed material layer of 60 μm in thickness, and thereby obtain a negative electrode.

Next, the slurry composition for a solid electrolyte layer was applied onto the positive electrode mixed material layer surface of the positive electrode and was dried (120° C., 60 minutes) so as to form a solid electrolyte layer of 150 μm in thickness, and thereby obtain a solid electrolyte layer-equipped positive electrode.

The solid electrolyte layer-equipped positive electrode and the negative electrode were laminated with the solid electrolyte layer of the solid electrolyte layer-equipped positive electrode and the negative electrode mixed material layer of the negative electrode in contact and were pressed to obtain an all-solid-state secondary battery. The thickness of the solid electrolyte layer in the post-pressing all-solid-state secondary battery was 100 μm. Output characteristics of this all-solid-state secondary battery were evaluated. The result is shown in Table 1.

Example 2

A slurry composition for a positive electrode mixed material layer, a slurry composition for a solid electrolyte layer, a positive electrode, and an all-solid-state secondary battery were prepared and various evaluations were performed in the same way as in Example 1 with the exception that a binder composition produced as described below was used. The results are shown in Table 1.

<Production of Binder Composition>

A 1 L septum-equipped flask that included a stirrer was charged with 100 parts of deionized water and 0.2 parts of sodium lauryl sulfate as an emulsifier, the gas phase was purged with nitrogen gas, and the temperature was raised to 60° C. Thereafter, 0.25 parts of ammonium persulfate as a polymerization initiator was dissolved in 20.0 parts of deionized water and was added into the flask.

Meanwhile, a monomer composition was obtained in a separate vessel by mixing 40 parts of deionized water, 1.0 parts of sodium lauryl sulfate as an emulsifier, and 7 parts of acrylonitrile, 50 parts of butyl acrylate, 23 parts of ethyl acrylate, and 20 parts of phenoxyethyl acrylate as monomers. The monomer composition was continuously added into the 1 L septum-equipped flask over 3 hours to perform polymerization. The reaction was carried out at 60° C. during addition. Once the addition was complete, a further 3 hours of stirring was performed at 80° C. to complete the reaction. The resultant water dispersion of a polymer was used to measure the amount of diisobutyl ketone (solvent) insoluble content in the polymer and to determine whether the polymer had good solubility or poor solubility in diisobutyl ketone. The result is shown in Table 1.

Next, an appropriate amount of sodium hydroxide was added to the obtained water dispersion of the polymer, and then an appropriate amount of diisobutyl ketone was further added as a solvent so as to obtain a mixture. Thereafter, distillation was performed under reduced pressure at 80° C. to remove water and excess diisobutyl ketone from the mixture, and thereby obtain a binder composition (solid content concentration: 8%). The obtained binder composition was used to measure the chemical composition of the polymer. The content of metal components in the binder composition was also measured. Each of the results is shown in Table 1.

Examples 3 and 4

A binder composition, a slurry composition for a positive electrode mixed material layer, a slurry composition for a solid electrolyte layer, a positive electrode, and an all-solid-state secondary battery were prepared and various evaluations were performed in the same way as in Example 1 with the exception that xylene (Example 3) or butyl butyrate (Example 4) was used instead of diisobutyl ketone as a solvent in production of the binder composition and the slurry compositions. The results are shown in Table 1.

Example 5

A binder composition, a slurry composition for a positive electrode mixed material layer, a slurry composition for a solid electrolyte layer, a positive electrode, and an all-solid-state secondary battery were prepared and various evaluations were performed in the same way as in Example 1 with the exception that the amount of sodium hydroxide added to the water dispersion of the polymer was increased in production of the binder composition. The results are shown in Table 1.

Example 6

A binder composition, a slurry composition for a positive electrode mixed material layer, a slurry composition for a solid electrolyte layer, a positive electrode, and an all-solid-state secondary battery were prepared and various evaluations were performed in the same way as in Example 1 with the exception that polyoxyethylene lauryl ether was used instead of sodium lauryl sulfate as an emulsifier and the amount of sodium hydroxide added to the water dispersion of the polymer was reduced in production of the binder composition. The results are shown in Table 1.

Examples 7 and 8

A binder composition, a slurry composition for a positive electrode mixed material layer, a slurry composition for a solid electrolyte layer, a positive electrode, and an all-solid-state secondary battery were prepared and various evaluations were performed in the same way as in Example 6 with the exception that 7 parts of acrylonitrile, 50 parts of butyl acrylate, 23 parts of ethyl acrylate, and 20 parts of phenoxyethyl acrylate were used as monomers and an appropriate amount of lithium hydroxide (Example 7) or magnesium hydroxide (Example 8) was added to the water dispersion of the polymer instead of sodium hydroxide in production of the binder composition. The results are shown in Table 1.

Example 9

A binder composition, a slurry composition for a positive electrode mixed material layer, a slurry composition for a solid electrolyte layer, a positive electrode, and an all-solid-state secondary battery were prepared and various evaluations were performed in the same way as in Example 1 with the exception that 32 parts of acrylonitrile, 58 parts of butyl acrylate, and 10 parts of styrene were used as monomers in production of the binder composition. The results are shown in Table 1.

Example 10

A binder composition, a slurry composition for a positive electrode mixed material layer, a slurry composition for a solid electrolyte layer, a positive electrode, and an all-solid-state secondary battery were prepared and various evaluations were performed in the same way as in Example 1 with the exception that 2 parts of acrylonitrile, 80 parts of butyl acrylate, and 18 parts of styrene were used as monomers in production of the binder composition. The results are shown in Table 2.

Example 11

A binder composition, a slurry composition for a positive electrode mixed material layer, a slurry composition for a solid electrolyte layer, a positive electrode, and an all-solid-state secondary battery were prepared and various evaluations were performed in the same way as in Example 1 with the exception that 6 parts of acrylonitrile, 88 parts of butyl acrylate, and 6 parts of styrene were used as monomers in production of the binder composition. The results are shown in Table 2.

Example 12

A binder composition, a slurry composition for a positive electrode mixed material layer, a slurry composition for a solid electrolyte layer, a positive electrode, and an all-solid-state secondary battery were prepared and various evaluations were performed in the same way as in Example 1 with the exception that 35 parts of acrylonitrile, 25 parts of butyl acrylate, and 40 parts of styrene were used as monomers in production of the binder composition. The results are shown in Table 2.

Example 13

A binder composition, a slurry composition for a positive electrode mixed material layer, a slurry composition for a solid electrolyte layer, a positive electrode, and an all-solid-state secondary battery were prepared and various evaluations were performed in the same way as in Example 1 with the exception that 15 parts of acrylonitrile, 80 parts of butyl acrylate, and 5 parts of styrene were used as monomers in production of the binder composition. The results are shown in Table 2.

Example 14

A binder composition, a slurry composition for a positive electrode mixed material layer, a slurry composition for a solid electrolyte layer, a positive electrode, and an all-solid-state secondary battery were prepared and various evaluations were performed in the same way as in Example 1 with the exception that 6 parts of acrylonitrile, 54 parts of butyl acrylate, and 40 parts of styrene were used as monomers in production of the binder composition. The results are shown in Table 2.

Example 15

A slurry composition for a positive electrode mixed material layer, a slurry composition for a solid electrolyte layer, a positive electrode, and an all-solid-state secondary battery were prepared and various evaluations were performed in the same way as in Example 1 with the exception that a binder composition produced as described below was used. The results are shown in Table 2.
<Production of Binder Composition>
A reactor was charged with 2 parts of potassium oleate as an emulsifier, 0.1 parts of potassium phosphate as a stabilizer, and 150 parts of water, and then 20 parts of acrylonitrile, 43 parts of 1,3-butadiene, 33 parts of butyl acrylate, and 14 parts of styrene as monomers and 0.31 parts of t-dodecyl mercaptan as a molecular weight modifier were further added. Emulsion polymerization was initiated at 10° C. in the presence of 0.015 parts of ferrous sulfate as an activator and 0.05 parts of paramenthane hydroperoxide as a polymerization initiator. At the point at which the polymerization conversion rate reached 85%, 0.2 parts of hydroxylamine sulfate was added per 100 parts of monomer to end polymerization.

Once polymerization had ended, heating was performed, unreacted monomer was collected through steam distillation under reduced pressure at 70° C., and then 2 parts of an alkylated phenol was added as an antioxidant to yield a copolymer latex.

A 1 L autoclave equipped with a stirrer was charged with 400 mL of the obtained copolymer latex (total solid content: 48 g), and then nitrogen gas was passed for 10 minutes in order to remove dissolved oxygen in the copolymer solution. Thereafter, 50 mg of palladium acetate was dissolved in 180 mL of water to which nitric acid had been added in an amount of 4 molar equivalents relative to the Pd and was then added into the autoclave as a hydrogenation reaction catalyst. Purging of the system with hydrogen gas was performed twice, and then the contents of the autoclave were heated to 50° C. in a state in which the pressure was raised to 3 MPa with hydrogen gas, and a hydrogenation reaction was carried out for 6 hours.

The contents were restored to normal temperature, the system was converted to a nitrogen atmosphere, and then an evaporator was used to performing concentrating to a solid content concentration of 40%, and thereby yield a water dispersion of a polymer (hydrogenated nitrile rubber). The obtained water dispersion of the polymer was used to measure the amount of diisobutyl ketone (solvent) insoluble content in the polymer and to determine whether the polymer had good solubility or poor solubility in diisobutyl ketone. The results are shown in Table 2.

Next, an appropriate amount of potassium hydroxide was added to the obtained water dispersion of the polymer, and then an appropriate amount of diisobutyl ketone was further added as a solvent so as to obtain a mixture. Thereafter, distillation was performed under reduced pressure at 80° C. to remove water and excess diisobutyl ketone from the mixture, and thereby obtain a binder composition (solid content concentration: 8%). The obtained binder composition was used to measure the chemical composition of the polymer. The content of metal components in the binder composition was also measured. Each of the results is shown in Table 2.

Example 16

A slurry composition for a positive electrode mixed material layer, a slurry composition for a solid electrolyte layer, a positive electrode, and an all-solid-state secondary battery were prepared and various evaluations were performed in the same way as in Example 1 with the exception that a binder composition produced as described below was used. The results are shown in Table 2.
<Production of Binder Composition>
<<Production of First Binder Composition Containing First Polymer>>

A first binder composition containing a first polymer was produced in the same way as the binder composition in Example 1 with the exception that 7 parts of acrylonitrile, 50 parts of butyl acrylate, 23 parts of ethyl acrylate, and 20 parts of phenoxyethyl acrylate were used as monomers. Moreover, by the same procedures as in Example 1, the first polymer was determined to have good solubility or poor solubility, the chemical composition of the first polymer was identified, and the content of metal components in the binder composition was measured. The results are shown in Table 2.
<<Production of Second Binder Composition Containing Second Polymer>>

A second binder composition containing a second polymer was produced in the same way as the binder composition in Example 1 with the exception that 10 parts of acrylonitrile, 69.5 parts of butyl acrylate, 20 parts of styrene, and 0.5 parts of allyl methacrylate were used as monomers. Moreover, by the same procedures as in Example 1, the second polymer was determined to have good solubility or poor solubility, the chemical composition of the second polymer was identified, and the content of metal components in the binder composition was measured. The results are shown in Table 2.
<<Mixing of First Binder Composition and Second Binder Composition>>

The first binder composition and the second binder composition described above were mixed such that the amounts of the first polymer and the second polymer in terms of solid content were 1:1 (mass ratio) in order to produce a binder composition.

Example 17

A binder composition, a slurry composition for a positive electrode mixed material layer, a slurry composition for a solid electrolyte layer, a positive electrode, and an all-solid-state secondary battery were prepared and various evaluations were performed in the same way as in Example 1 with the exception that 7 parts of acrylonitrile, 50 parts of butyl acrylate, 23 parts of ethyl acrylate, and parts of phenoxyethyl acrylate were used as monomers in production of the binder composition and that an oxide inorganic solid electrolyte ($Li_7La_3Zr_2O_{12}$; number-average particle diameter: 1.2 μm) was used instead of sulfide glass in production of the slurry compositions (slurry composition for a solid electrolyte layer and slurry composition for a positive electrode mixed material layer). The results are shown in Table 2.

Example 18

A slurry composition for a positive electrode mixed material layer, a slurry composition for a solid electrolyte layer, a positive electrode, and an all-solid-state secondary battery were prepared and various evaluations were performed in the same way as in Example 1 with the exception that a second binder composition containing a second polymer that was produced in the same way as in Example 16 was used as a binder composition. The results are shown in Table 2.

Example 19

A slurry composition for a positive electrode mixed material layer, a slurry composition for a solid electrolyte layer, a positive electrode, and an all-solid-state secondary battery were prepared and various evaluations were performed in the same way as in Example 1 with the exception that a binder composition produced as described below was used. The results are shown in Table 3.
<Production of Binder Composition>

A reactor was charged with 180 parts of deionized water, 25 parts of sodium dodecylbenzenesulfonate aqueous solution (concentration: 10%) as an emulsifier, 20 parts of acrylonitrile and 25 parts of butyl acrylate as monomers, and 0.3 parts of t-dodecyl mercaptan as a molecular weight modifier in this order. Next, gas inside the reactor was purged three times with nitrogen, and then 55 parts of 1,3-butadiene was added as a monomer. The reactor was held at 10° C. while 0.1 parts of cumene hydroperoxide as a polymerization initiator and 0.1 parts of ferrous sulfate were added so as to initiate a polymerization reaction that was then caused to progress under stirring. At the point at which the polymerization conversion rate reached 90%, 0.2 parts of hydroxylamine sulfate was added per 100 parts of monomer to end polymerization. Next, residual monomer was removed under reduced pressure at a water temperature of 80° C. to obtain a particulate water dispersion of a polymer precursor (copolymer latex).

A 1 L autoclave equipped with a stirrer was charged with 400 mL of the obtained copolymer latex (total solid content: 48 g), and then nitrogen gas was passed for 10 minutes in order to remove dissolved oxygen in the copolymer latex. Thereafter, 50 mg of palladium acetate was dissolved in 180 mL of water to which nitric acid had been added in an amount of 4 molar equivalents relative to the Pd and was then added into the autoclave as a hydrogenation reaction catalyst. Purging of the system with hydrogen gas was performed twice, and then the contents of the autoclave were heated to 50° C. in a state in which the pressure was raised to 3 MPa with hydrogen gas, and a hydrogenation reaction was carried out for 6 hours.

In addition, 50 g of the resultant polymer was loaded into and sealed in a cellulose tube for dialysis having a pore diameter of 5 nm and was subsequently immersed in a vessel containing deionized water. Dialysis was performed for 48 hours while causing the surrounding deionized water to pass through the cellulose tube so as to remove residual palladium.

Next, appropriate amounts of sodium hydroxide, a ruthenium organic complex, and a rhodium organic complex were added to the obtained water dispersion of the polymer, and then an appropriate amount of diisobutyl ketone was further added as a solvent so as to obtain a mixture. Thereafter, distillation was performed under reduced pressure at 80° C. to remove water and excess diisobutyl ketone from the mixture, and thereby obtain a binder composition (solid content concentration: 8%). The obtained binder composition was used to measure the chemical composition of the polymer. The content of metal components in the binder composition was also measured. Each of the results is shown in Table 3.

Comparative Example 1

A binder composition, a slurry composition for a positive electrode mixed material layer, a slurry composition for a solid electrolyte layer, and a positive electrode were produced and various evaluations were performed in the same way as in Example 1 with the exception that polyoxyethylene lauryl ether was used instead of sodium lauryl sulfate as an emulsifier and that sodium hydroxide was not added to the water dispersion of the polymer in production of the binder composition. The results are shown in Table 3. Note that the binder composition did not contain group 1 or 2 metal ions (less than 5 mass ppm relative to polymer).

Comparative Example 2

A binder composition, a slurry composition for a positive electrode mixed material layer, a slurry composition for a solid electrolyte layer, and a positive electrode were produced and various evaluations were performed in the same way as in Example 5 with the exception that the additive amount of sodium hydroxide was further increased in production of the binder composition. The results are shown in Table 3.

Comparative Examples 3 to 5

A binder composition, a slurry composition for a positive electrode mixed material layer, a slurry composition for a solid electrolyte layer, and a positive electrode were produced and various evaluations were performed in the same way as in Example 1 with the exception that 4-heptanone (Comparative Example 3), methyl isobutyl ketone (Comparative Example 4), or ethyl acetate (Comparative Example 5) was used instead of diisobutyl ketone as a solvent in production of the binder composition and the slurry compositions. The results are shown in Table 3.

In Tables 1 to 3, shown below:
"Vinyl cyanide" indicates vinyl cyanide monomer unit;
"(Meth)acrylic acid ester (ring-free)" indicates (meth) acrylic acid ester monomer unit not including aromatic hydrocarbon ring;
"Aromatic" indicates aromatic monomer unit;
"AN" indicates acrylonitrile unit;
"BA" indicates butyl acrylate unit;
"EA" indicates ethyl acrylate unit;
"ST" indicates styrene unit;
"PEA" indicates phenoxyethyl acrylate unit;
"H-BD" indicates hydrogenated 1,3-butadiene unit;
"AMA" indicates allyl methacrylate unit;
"Good" indicates good solubility;
"Poor" indicates poor solubility;
"DIK" indicates diisobutyl ketone;
"XY" indicates xylene;
"HB" indicates butyl butyrate;
"HE" indicates 4-heptanone;
"MBK" indicates methyl isobutyl ketone;
"EAc" indicates ethyl acetate;
"Sulfide" indicates sulfide solid electrolyte;
"Oxide" indicates oxide solid electrolyte;
"Na" indicates sodium ions;
"Li" indicates lithium ions;
"Mg" indicates magnesium ions;
"K" indicates potassium ions;
"Pd" indicates palladium;
"Ru" indicates ruthenium;
"Rh" indicates rhodium; and
"Carbon number" indicates number of carbon atoms.

TABLE 1

| Slurry composition | Binder composition | Polymer | Chemical composition | Vinyl cyanide | Type | Example 1 | Example 2 | Example 3 | Example 4 | Example 5 |
|---|---|---|---|---|---|---|---|---|---|---|
| | | | | | Type | AN | AN | AN | AN | AN |
| | | | | | Proportion [mass %] | 6 | 7 | 6 | 6 | 6 |
| | | | | (Meth)acrylic acid ester (ring-free) | Type | BA | BA | BA | BA | BA |
| | | | | | Proportion [mass %] | 69 | 50 | 69 | 69 | 69 |
| | | | | | Type | — | EA | — | — | — |
| | | | | | Proportion [mass %] | — | 23 | — | — | — |
| | | | | Aromatic | Type | ST | PEA | ST | ST | ST |
| | | | | | Proportion [mass %] | 25 | 20 | 25 | 25 | 25 |
| | | | | Other | Type | — | — | — | — | — |
| | | | | | Proportion [mass %] | — | — | — | — | — |

TABLE 1-continued

|  |  |  |  |  |  |  |  |  |  |
|---|---|---|---|---|---|---|---|---|---|
|  |  |  | Property in solvent |  | Good | Good | Good | Good | Good |
|  | Metal | Group 1 or 2 | Type |  | Na | Na | Na | Na | Na |
|  | component |  | Content [mass ppm] |  | 300 | 1000 | 300 | 300 | 4500 |
|  |  | Other | Type |  | — | — | — | — | — |
|  |  |  | Content [mass ppm] |  | — | — | — | — | — |
|  | Solvent |  | Carbon number [carbon atoms] |  | 9 | 9 | 8 | 8 | 9 |
|  |  |  | Type |  | DIK | DIK | XY | HB | DIK |
|  | Solid electrolyte |  |  |  | Sulfide | Sulfide | Sulfide | Sulfide | Sulfide |
|  | Dispersibility |  |  |  | A | A | B | A | B |
|  | Preservation stability (for solid electrolyte layer) |  |  |  | A | A | A | A | A |
|  | Ion conductivity |  |  |  | A | A | A | C | A |
|  | Preservation stability (for positive electrode mixed material layer) |  |  |  | A | A | A | A | B |
|  | Output characteristics |  |  |  | A | A | A | A | A |
|  | Adhesiveness |  |  |  | A | A+ | A | A | A |

|  |  |  |  |  |  | Example 6 | Example 7 | Example 8 | Example 9 |
|---|---|---|---|---|---|---|---|---|---|
| Slurry composition | Binder composition | Polymer | Chemical composition | Vinyl cyanide | Type | AN | AN | AN | AN |
|  |  |  |  |  | Proportion [mass %] | 6 | 7 | 7 | 32 |
|  |  |  |  | (Meth)acrylic acid ester (ring-free) | Type | BA | BA | BA | BA |
|  |  |  |  |  | Proportion [mass %] | 69 | 50 | 50 | 58 |
|  |  |  |  |  | Type | — | EA | EA | — |
|  |  |  |  |  | Proportion [mass %] | — | 23 | 23 | — |
|  |  |  |  | Aromatic | Type | ST | PEA | PEA | ST |
|  |  |  |  |  | Proportion [mass %] | 25 | 20 | 20 | 10 |
|  |  |  |  | Other | Type | — | — | — | — |
|  |  |  |  |  | Proportion [mass %] | — | — | — | — |
|  |  |  | Property in solvent |  |  | Good | Good | Good | Good |
|  |  | Metal component | Group 1 or 2 | Type |  | Na | Li | Mg | Na |
|  |  |  |  | Content [mass ppm] |  | 7 | 500 | 800 | 300 |
|  |  |  | Other | Type |  | — | — | — | — |
|  |  |  |  | Content [mass ppm] |  | — | — | — | — |
|  |  | Solvent |  | Carbon number [carbon atoms] |  | 9 | 9 | 9 | 9 |
|  |  |  |  | Type |  | DIK | DIK | DIK | DIK |
|  | Solid electrolyte |  |  |  |  | Sulfide | Sulfide | Sulfide | Sulfide |
|  | Dispersibility |  |  |  |  | A | A | A | A |
|  | Preservation stability (for solid electrolyte layer) |  |  |  |  | A | A | A | B |
|  | Ion conductivity |  |  |  |  | B | A | A | A |
|  | Preservation stability (for positive electrode mixed material layer) |  |  |  |  | A | A | A | B |
|  | Output characteristics |  |  |  |  | A | A | A | A |
|  | Adhesiveness |  |  |  |  | A | A+ | A+ | B |

TABLE 2

|  |  |  |  |  |  | Example 10 | Example 11 | Example 12 | Example 13 | Example 14 |
|---|---|---|---|---|---|---|---|---|---|---|
| Slurry composition | Binder composition | Polymer | Chemical composition | Vinyl cyanide | Type | AN | AN | AN | AN | AN |
|  |  |  |  |  | Proportion [mass %] | 2 | 6 | 35 | 15 | 6 |
|  |  |  |  | (Meth)acrylic acid ester (ring-free) | Type | BA | BA | BA | BA | BA |
|  |  |  |  |  | Proportion [mass %] | 80 | 88 | 25 | 80 | 54 |
|  |  |  |  |  | Type | — | — | — | — | — |
|  |  |  |  |  | Proportion [mass %] | — | — | — | — | — |
|  |  |  |  | Aromatic | Type | ST | ST | ST | ST | ST |
|  |  |  |  |  | Proportion [mass %] | 18 | 6 | 40 | 5 | 40 |
|  |  |  |  | Other | Type | — | — | — | — | — |
|  |  |  |  |  | Proportion [mass %] | — | — | — | — | — |
|  |  |  | Property in solvent |  |  | Good | Good | Good | Good | Good |
|  |  | Metal component | Group 1 or 2 | Type |  | Na | Na | Na | Na | Na |
|  |  |  |  | Content [mass ppm] |  | 300 | 300 | 300 | 300 | 300 |
|  |  |  | Other | Type |  | — | — | — | — | — |
|  |  |  |  | Content [mass ppm] |  | — | — | — | — | — |
|  |  | Solvent |  | Carbon number [carbon atoms] |  | 9 | 9 | 9 | 9 | 9 |
|  |  |  |  | Type |  | DIK | DIK | DIK | DIK | DIK |
|  | Solid electrolyte |  |  |  |  | Sulfide | Sulfide | Sulfide | Sulfide | Sulfide |

TABLE 2-continued

|  |  | | | | | | | | |
|---|---|---|---|---|---|---|---|---|---|
| Dispersibility | | | | | | B | B | B | A | B |
| Preservation stability (for solid electrolyte layer) | | | | | | B | B | B | A | B |
| Ion conductivity | | | | | | A | A | A | A | A |
| Preservation stability (for positive electrode mixed material layer) | | | | | | B | B | B | B | A |
| Output characteristics | | | | | | A | A | A | A | A |
| Adhesiveness | | | | | | A | B | B | B | B |

|  |  |  |  |  |  |  | Example 15 | Example 16 | Example 17 | Example 18 |
|---|---|---|---|---|---|---|---|---|---|---|
| Slurry composition | Binder composition | Polymer | Chemical composition | Vinyl cyanide | | Type | AN | AN | AN | AN |
| | | | | | | Proportion [mass %] | 18 | 7 | 10 | 7 | 10 |
| | | | | (Meth)acrylic acid ester (ring-free) | | Type | BA | BA | BA | BA | BA |
| | | | | | | Proportion [mass %] | 30 | 50 | 69.5 | 50 | 69.5 |
| | | | | | | Type | — | EA | — | EA | — |
| | | | | | | Proportion [mass %] | — | 23 | — | 23 | — |
| | | | | Aromatic | | Type | ST | PEA | ST | PEA | ST |
| | | | | | | Proportion [mass %] | 12 | 20 | 20 | 20 | 20 |
| | | | | Other | | Type | H-BD | — | AMA | — | AMA |
| | | | | | | Proportion [mass %] | 40 | — | 0.5 | — | 0.5 |
| | | | | Property in solvent | | | Good | Good | Poor | Good | Poor |
| | | Metal component | Group 1 or 2 | | | Type | K | Na | Na | Na | Na |
| | | | | | | Content [mass ppm] | 3000 | 300 | 300 | 300 | 300 |
| | | | Other | | | Type | Pd | — | — | — | — |
| | | | | | | Content [mass ppm] | 100 | — | — | — | — |
| | Solvent | | Carbon number [carbon atoms] | | | | 9 | 9 | 9 | 9 |
| | | | Type | | | | DIK | DIK | DIK | DIK |
| Solid electrolyte | | | | | | | Sulfide | Sulfide | Oxide | Sulfide |
| Dispersibility | | | | | | | A | A | A | C |
| Preservation stability (for solid electrolyte layer) | | | | | | | A | A | A | B |
| Ion conductivity | | | | | | | A | A | A | A |
| Preservation stability (for positive electrode mixed material layer) | | | | | | | A | A | A | B |
| Output characteristics | | | | | | | A+ | A | A+ | A | B |
| Adhesiveness | | | | | | | B | A+ | A+ | B |

TABLE 3

|  |  |  |  |  |  |  | Example 19 | Comparative Example 1 | Comparative Example 2 | Comparative Example 3 | Comparative Example 4 | Comparative Example 5 |
|---|---|---|---|---|---|---|---|---|---|---|---|---|
| Slurry composition | Binder composition | Polymer | Chemical composition | Vinyl cyanide | | Type | AN | AN | AN | AN | AN | AN |
| | | | | | | Proportion [mass %] | 20 | 6 | 6 | 6 | 6 | 6 |
| | | | | (Meth)acrylic acid ester (ring-free) | | Type | BA | BA | BA | BA | BA | BA |
| | | | | | | Proportion [mass %] | 25 | 69 | 69 | 69 | 69 | 69 |
| | | | | | | Type | — | — | — | — | — | — |
| | | | | | | Proportion [mass %] | — | — | — | — | — | — |
| | | | | Aromatic | | Type | — | ST | ST | ST | ST | ST |
| | | | | | | Proportion [mass %] | — | 25 | 25 | 25 | 25 | 25 |
| | | | | Other | | Type | H-BD | — | — | — | — | — |
| | | | | | | Proportion [mass %] | 55 | — | — | — | — | — |
| | | | | Property in solvent | | | Good | Good | Good | Good | Good | Good |
| | | Metal component | Group 1 or 2 | | | Type | Na | — | Na | Na | Na | Na |
| | | | | | | Content [mass ppm] | 3000 | — | 8000 | 300 | 300 | 300 |
| | | | Other | | | Type | Ru, Rh | — | — | — | — | — |
| | | | | | | Content [mass ppm] | Ru:1 Rh: 3 (Total: 4) | — | — | — | — | — |
| | Solvent | | Carbon number [carbon atoms] | | | | 9 | 9 | 9 | 7 | 6 | 3 |
| | | | Type | | | | DIK | DIK | DIK | HE | MBK | EAc |
| Solid electrolyte | | | | | | | Sulfide | Sulfide | Sulfide | Sulfide | Sulfide | Sulfide |
| Dispersibility | | | | | | | A | D | D | D | D | D |
| Preservation stability (for solid electrolyte layer) | | | | | | | A | D | D | D | D | D |
| Ion conductivity | | | | | | | A | D | C | E | E | E |

TABLE 3-continued

|  | Example 19 | Comparative Example 1 | Comparative Example 2 | Comparative Example 3 | Comparative Example 4 | Comparative Example 5 |
| --- | --- | --- | --- | --- | --- | --- |
| Preservation stability (for positive electrode mixed material layer) | A | D | D | D | D | D |
| Output characteristics | A+ | D | D | D | D | D |
| Adhesiveness | B | D | D | D | D | D |

It can be seen from Tables 1 to 3 that through the binder compositions of Examples 1 to 19, it was possible to produce a slurry composition having excellent dispersibility and preservation stability and to form a solid electrolyte layer having excellent ion conductivity. It can also be seen that adhesiveness of a positive electrode mixed material layer was good and that an all-solid-state secondary battery could display excellent output characteristics in Examples 1 to 19.

In contrast, it can be seen from Table 3 that dispersibility and preservation stability of a slurry composition, ion conductivity of a solid electrolyte layer, adhesiveness of a positive electrode mixed material layer, and output characteristics of an all-solid-state secondary battery deteriorated in Comparative Examples 1 and 2 in which a binder composition having a group 1 or 2 metal ion content that was outside of a specific range was used.

It can also be seen from Table 3 that dispersibility and preservation stability of a slurry composition, ion conductivity of a solid electrolyte layer, adhesiveness of a positive electrode mixed material layer, and output characteristics of an all-solid-state secondary battery deteriorated in Comparative Examples 3 to 5 in which a binder composition containing only an organic solvent having a carbon number of 7 or less as a solvent was used.

INDUSTRIAL APPLICABILITY

According to the present disclosure, it is possible to provide a binder composition for an all-solid-state secondary battery that can produce a slurry composition for an all-solid-state secondary battery having excellent dispersibility and preservation stability and that can cause a solid electrolyte-containing layer to display excellent ion conductivity.

Moreover, according to the present disclosure, it is possible to provide a slurry composition for an all-solid-state secondary battery that has excellent dispersibility and preservation stability and that can form a solid electrolyte-containing layer having excellent ion conductivity.

Furthermore, according to the present disclosure, it is possible to provide a solid electrolyte-containing layer that has excellent ion conductivity and an all-solid-state secondary battery that includes this solid electrolyte-containing layer.

The invention claimed is:

1. A binder composition for an all-solid-state secondary battery comprising: a polymer; ions of a metal belonging to group 1 or group 2 of the periodic table; and a solvent, wherein
the solvent includes an organic solvent having a carbon number of 8 or more,
content of the ions of the metal is not less than 5 mass ppm and not more than 3,000 mass ppm relative to the polymer, and
the polymer includes a vinyl cyanide monomer unit in a proportion of not less than 2 mass % and not more than 10 mass %.

2. The binder composition for an all-solid-state secondary battery according to claim 1, wherein the organic solvent having a carbon number of 8 or more includes one or more selected from the group consisting of an aromatic hydrocarbon ring, a non-aromatic hydrocarbon group, and a carbonyl group.

3. The binder composition for an all-solid-state secondary battery according to claim 1, wherein the polymer includes either or both of a nitrogen-containing functional group and a carbonyl group.

4. The binder composition for an all-solid-state secondary battery according to claim 1, wherein the polymer includes a (meth)acrylic acid ester monomer unit that does not include an aromatic hydrocarbon ring in a proportion of not less than 25 mass % and not more than 95 mass %.

5. The binder composition for an all-solid-state secondary battery according to claim 1, wherein the polymer includes an aromatic monomer unit in a proportion of not less than 3 mass % and not more than 40 mass %.

6. The binder composition for an all-solid-state secondary battery according to claim 5, wherein the aromatic monomer unit includes a (meth)acrylic acid ester monomer unit that includes an aromatic hydrocarbon ring.

7. A slurry composition for an all-solid-state secondary battery comprising: a solid electrolyte; and the binder composition for an all-solid-state secondary battery according to claim 1.

8. The slurry composition for an all-solid-state secondary battery according to claim 7, wherein the solid electrolyte includes either or both of a sulfide inorganic solid electrolyte and an oxide inorganic solid electrolyte.

9. A solid electrolyte-containing layer formed using the slurry composition for an all-solid-state secondary battery according to claim 7.

10. An all-solid-state secondary battery comprising the solid electrolyte-containing layer according to claim 9.

* * * * *